United States Patent
Carr et al.

[11] Patent Number: 5,924,076
[45] Date of Patent: Jul. 13, 1999

[54] COIN OPERATED DEVICE COLLECTION SCHEDULER

[75] Inventors: Brian P. Carr, Jefferson Valley, N.Y.; Alex C. Meng, Fairfield, Conn.; Rajesh Kumar Sah, New York, N.Y.

[73] Assignee: Bell Atlantic Science & Technology, White Plains, N.Y.

[21] Appl. No.: 08/697,020

[22] Filed: Aug. 16, 1996

[51] Int. Cl.⁶ .................................................. G06F 15/20
[52] U.S. Cl. ...................... 705/7; 705/8; 705/9; 705/22; 379/146
[58] Field of Search .................. 705/7, 8, 9, 22

[56] References Cited

U.S. PATENT DOCUMENTS

| | | | |
|---|---|---|---|
| 4,208,549 | 6/1980 | Pollilo et al. | 379/146 |
| 4,744,026 | 5/1988 | Vanderbei | 705/8 |
| 4,744,027 | 5/1988 | Bayer et al. | 705/7 |
| 4,744,028 | 5/1988 | Karmarkar | 705/8 |
| 4,885,686 | 12/1989 | Vanderbei | 364/468.05 |
| 4,924,386 | 5/1990 | Freedman et al. | 705/8 |
| 5,027,388 | 6/1991 | Bradshaw et al. | 379/112 |
| 5,053,970 | 10/1991 | Kurihara et al. | 364/468.1 |
| 5,072,401 | 12/1991 | Sansone et al. | 364/478.07 |
| 5,185,780 | 2/1993 | Leggett | 379/34 |
| 5,237,497 | 8/1993 | Sitarski | 705/8 |
| 5,251,152 | 10/1993 | Notess | 395/200.54 |
| 5,285,494 | 2/1994 | Sprecher et al. | 455/423 |
| 5,289,368 | 2/1994 | Jordan et al. | 705/8 |
| 5,303,170 | 4/1994 | Valko | 364/578 |
| 5,321,605 | 6/1994 | Chapman et al. | 705/7 |
| 5,337,253 | 8/1994 | Berkovsky et al. | 705/22 |
| 5,343,387 | 8/1994 | Honma et al. | 705/9 |
| 5,416,694 | 5/1995 | Parrish et al. | 705/8 |

*Primary Examiner*—Allen R. MacDonald
*Assistant Examiner*—Jagdish Patel
*Attorney, Agent, or Firm*—Proskauer Rose LLP

[57] ABSTRACT

A method for determining an optimal coin operated coin collection date accounts for weather and seasonal effects on the expected revenue stream. One method according to the present invention may include: determining the expected base revenue for the coin operated device; adjusting, if necessary, the expected base revenue to account for the effects of weather and season; and determining the optimal collection date using the adjusted revenue.

25 Claims, 5 Drawing Sheets

COIN OPERATED DEVICE COLLECTION SCHEDULER

BACKGROUND OF THE INVENTION

1. Field of the Invention

The present invention relates to a method for efficiently scheduling pay telephone and coin collections for coin operated devices and, more particularly, to a method for scheduling coin collections which considers past collection history, weather effects, and seasonal cycles to determine efficient collection dates for coin operated devices such as pay telephones and vending machines.

2. Discussion of Related Art

Coin operated devices, such as pay telephones and vending machines, provide a great convenience to the public. They also provide revenue for the service provider operating the device. For telephone service providers, for example, to continue providing public pay telephones (or to add more public pay phones), these phones should be profitable.

Accurate collection schedules for collecting coins from pay telephones increases the profitability of pay telephones. For example, collecting coins infrequently reduces the potential revenue for the phone. This is because once a pay telephone's coin box is full, the telephone automatically goes out of service. This "down time" stops the potential revenue stream for that phone until the coins are collected. Collecting the coins too frequently increases the maintenance overhead for the telephone because of the increased labor and service costs needed to collect the coins. If coins are collected too frequently, the telephones become expensive and less profitable to operate. Similar considerations exist for vending machines and other coin operated devices. Therefore, it is advantageous to maximize the profitability of coin operated devices by scheduling coin collections in a manner which maximizes the profitability of the device.

How often a pay telephone or vending machine is used may vary according to the time of year and the weather. For example, a telephone near a public school may be used more frequently during the school year than during the summer. A telephone near a beach may be used more frequently in the summer. Outdoor phones may be used less frequently in cold, rainy, or snowy weather.

Known collection schedule methods do not automatically consider seasonal patterns or weather effects on a telephone's revenue stream when determining an optimally efficient collection schedule.

SUMMARY OF THE INVENTION

The present invention provides a method for determining an optimal coin collection date for a coin operated device, which method accounts for weather and seasonal effects on the revenue stream.

A preferred method according to the present invention includes determining an expected base revenue for a coin operated device such as a telephone or vending machine; adjusting, if necessary, the expected base revenue to account for the effects of weather and season; and determining the collection date using the adjusted revenue.

In a preferred embodiment of this method, an optimal collection date for a telephone (or vending machine) is determined in the following manner. To determine the expected base revenue, data contributing to the volatility of the revenue stream are removed. First, unreliable data are eliminated from prior revenue data for the telephone. Second, data relating to weather effects are eliminated from the prior revenue data. Next, the now "stabilized" previous revenue stream is added up and a base revenue and a target revenue are determined. After the expected base revenue is determined, this base is adjusted for adverse weather effects by applying predetermined weather index to the expected base revenue. This value is then adjusted for seasonal effects by applying predetermined seasonal indices to the weather adjusted values. The fully-adjusted values are totaled to determine an optimal collection date. Preferably, this is the date on which the total expected revenue is the greatest total revenue amount not exceeding the target revenue. This date may be adjusted to coincide with a date on which a collection is being performed along the route on which the telephone is located. Preferably, the collection date is set for the actual collection date immediately prior to the optimal date.

In a preferred embodiment, the weather and seasonal indices for a coin operated device are determined in the following manner. First, the weather indices are determined. This is preferably done in the following manner. Unreliable data are eliminated from prior revenue data for the telephone. The initial volatility for the telephone is determined. Past revenue history is reviewed to determine the likely effect of weather on the expected revenue of the telephone. For example, the effect of the average temperature or the number of inches of snow received may be looked at to determine their effects on revenue. If the weather effect exceeds a threshold level, the indices is recorded. The expected and actual deviations from the base revenue are determined. If necessary, a multiplication factor for a particular device is determined to reduce volatility of the weather adjusted values for that device. The index, with the multiplication factor, if necessary, is applied to the optimal collection date determination for the device.

Once the weather indices are determined, the seasonal indices are determined. This is preferably done in the following manner. It is determined whether enough data exists for the device being considered for reliable seasonal data. If so, the seasonal indices are determined. This is preferably done by dividing a year into equal blocks and comparing the variance of the actual revenue of each block with the expected revenue of that block. Next, the degree to which the annual indices will be applied is determined.

BRIEF DESCRIPTION OF THE DRAWINGS

The present invention is described with reference to the following figures.

DETAILED DESCRIPTION OF PREFERRED EMBODIMENTS

The present invention is a method for determining, through the use of a computer or other processing device, an optimal next collection date taking into consideration, if necessary, seasonal and weather effects on the use of the coin operated device.

Determining the Optimal Collection Date

Figure 1:
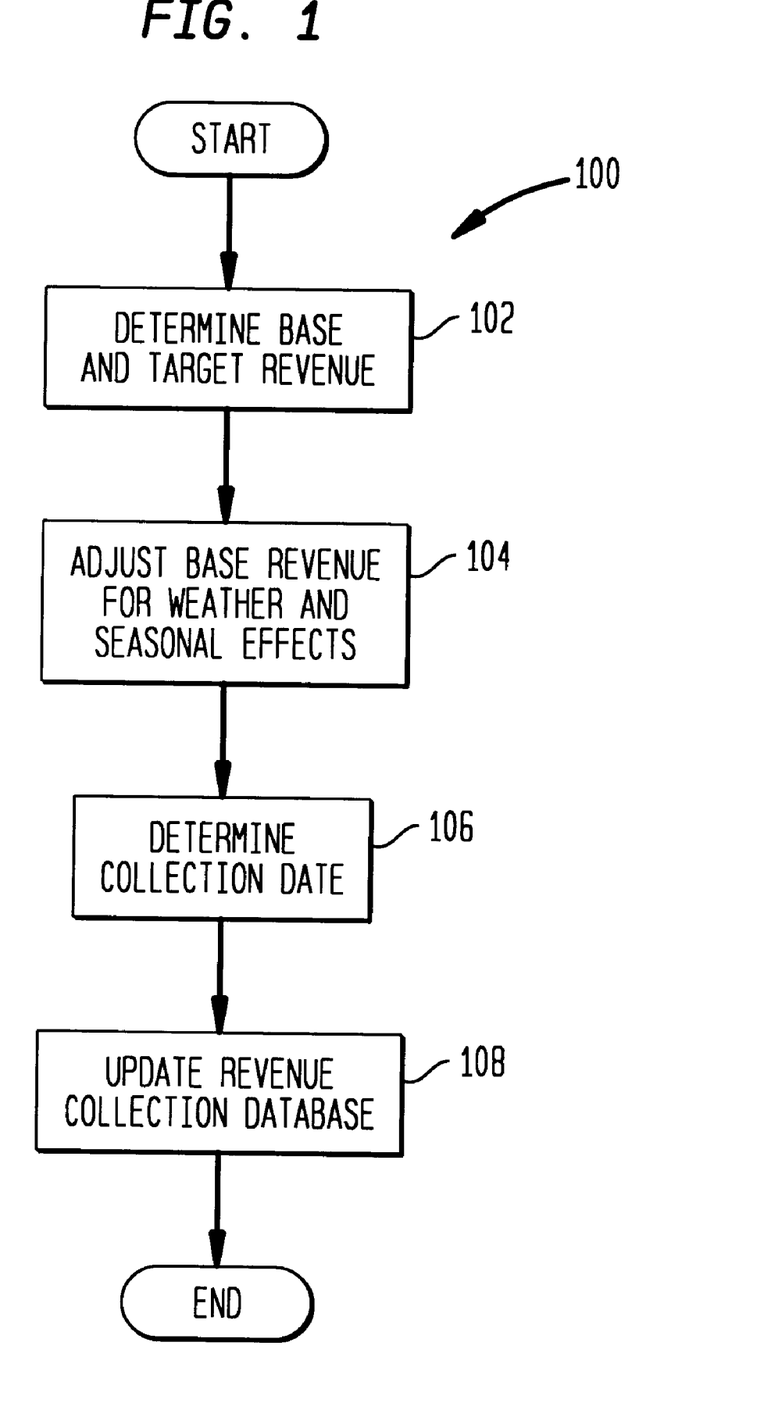
FIG. 1 is a flow chart of a preferred method according to the present invention for determining a next collection date.

FIG. 1 is a flow chart illustrating a method 100 for determining an optimal next collection date for a coin operated device, such as pay telephone or vending machine, according to a preferred embodiment of the invention. First, a base revenue and a target revenue are determined for the device (step 102). The base revenue is an expected revenue for a time period (e.g., a day, week or month) referred to herein as a revenue stream unit. The target revenue is the desired amount of money in the device at the collection. Second, the base revenue is adjusted for weather and seasonal effects (step 104). The collection date is determined by adding up the adjusted base revenue for future revenue stream units (such as days or weeks) until the total expected revenue approaches the target revenue (step 106). After the revenue is collected, the collection record may be added (step 108) to a collection and revenue database for future use.

Figure 2:
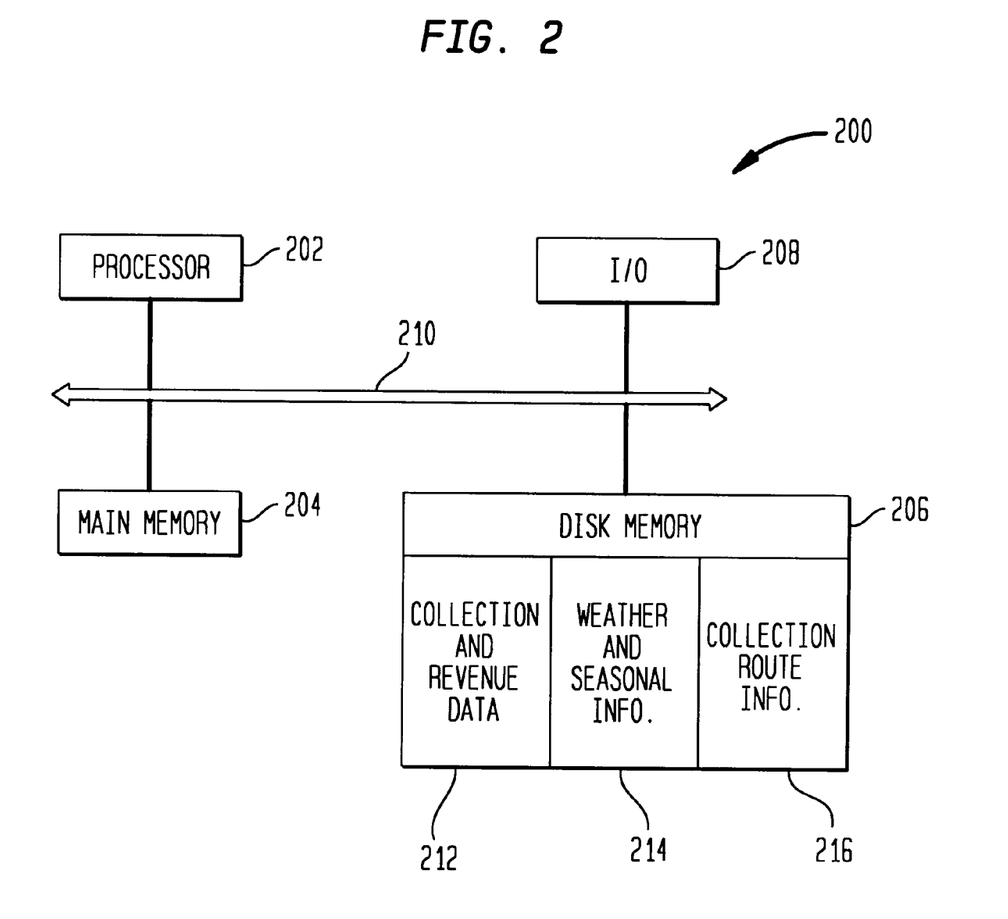
FIG. 2 is a block diagram illustrating a device performing the inventive method.

FIG. 2 depicts a conventional computer system 200. The computer system 200 has a processor 202 comprising one or more CPUs, a main memory 204, a disk memory 206, and an input device 208, such as a keyboard and mouse. These devices 202–208 are connected to a bus 210 which transfers data, i.e., instructions and information, between the devices 202–208. A memory, such as the disk memory 206, includes databases containing information relevant to the present invention. A first database 212 includes collection dates and amounts collected. A second database 214 includes weather and seasonal information, such as historic weather information, current weather forecasts, regional averages, and weather and seasonal indices (described below). A third database 216 includes actual collection route information, such as which telephones are located on which collection routes and dates on which a collector takes each route. The purpose of these databases will be made apparent below. Naturally, databases may be organized in any number of ways.

Figure 3:
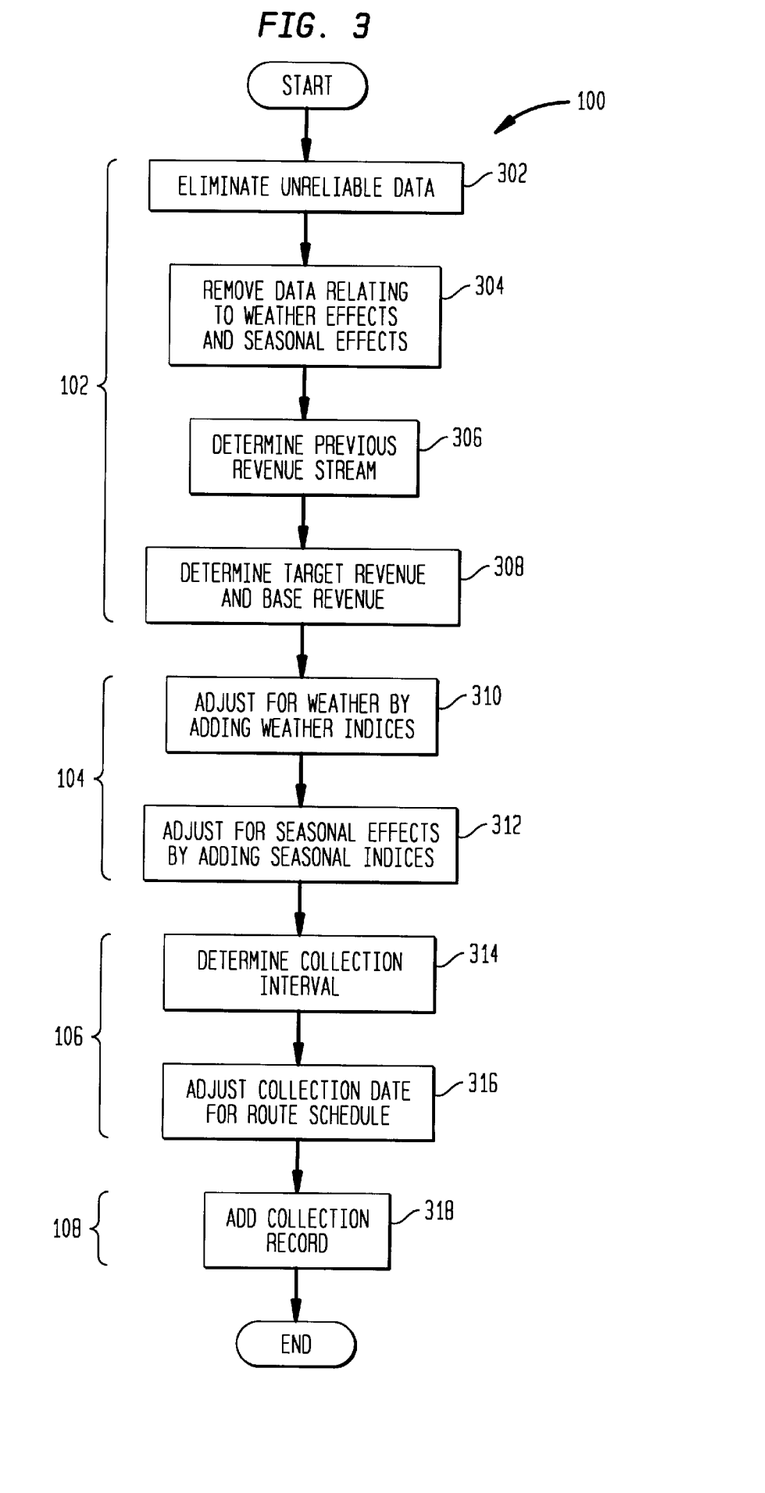
FIG. 3 is a more detailed flow chart of the method illustrated in FIG. 1.

FIG. 3 is a flow chart illustrating in more detail the method 100 of FIG. 1.

The base revenue is determined (step 102 above) by the following four steps.

Collection and revenue data for a particular coin operated device is retrieved from the first database 212. This data is presented to the processor 202 via the bus 210.

Data contributing to volatility of the revenue stream are removed by the processor 202. First, unreliable data are eliminated (step 302). This may be done in any number of ways. For example, overall average revenue data may be determined by the processor 202 from all of the collection data for the device. The processor 202 may determine the overall average data by dividing the total revenue by some unit, such as the number of days, weeks, or months that the revenue was collected. This yields a daily, weekly, or monthly average. The processor 202 may eliminate as unreliable collections having revenue greater than or less than a predetermined factor of the average. Also, the processor 202 may eliminate as unreliable all collection intervals (i.e., the time between collections) greater than or less than a predetermined factor. This will eliminate, for example, data from times when a device was out of service. The inventors have found that for both revenue and collections data, a preferred predetermined factor is 10. That is, all revenue collections 10 times greater or 10 times less than the average are eliminated as unreliable; all collections occurring 10 times less frequently (or more frequently) are also eliminated as unreliable. These exaggerated data points are "filtered out" as unreliable, spiky data.

Second, data relating to weather and seasonal effects are eliminated (step 304). Weather effects tend to cause collection data to deviate of the norm from the "filtered" data. In order to study non-weather related cycles (such as the school year, time of year, etc.), the deviation caused by weather is eliminated. Although weather typically deviates according to season, the weather has a more volatile effect on the revenue. For example, on a July day, a greater than the annual average revenue stream may be expected from a pay phone near a beach. However, this number may be exaggerated on a particularly hot day, or suppressed on a rainy day. For similar reasons, temperature effects are considered before rain effects, which are considered before snow effects. Weather and seasonal data relevant to the coin operated device are retrieved from the second database 214 and presented to the processor 202 via the bus 210.

The weather and seasonal effects are eliminated by processor 202 by dividing a data point (such as the daily, weekly, or monthly average determined above) by a predetermined weather and/or seasonal index included in the retrieved weather and seasonal data. (How the weather and seasonal indices are obtained is described below.)

Third, the previous revenue stream for the coin operated device under consideration is determined (step 306). The total amount of revenue generated by the device under consideration, adjusted to eliminate the unreliable and weather-affected data, is determined. This is preferably performed by the processor 202 by adding up the adjusted previous collection data determined above. To properly consider a revenue stream, the number of collections added up by the processor 202 preferably should relate to the revenue stream units. For example, if collections are made twice weekly, and the revenue stream units are weekly intervals, only an even number of collections should be considered by the processor 202. This prevents inaccurate determinations due to consideration of an uneven number of collections in revenue stream units.

The number of past collections which the processor 202 adds up to determine the previous revenue stream is preferably limited to a statistically significant number. The inventors have found empirically that 24 collections is an optimal number of collections to be combined if collections are made bi-weekly. The base revenue is determined by dividing the adjusted previous revenue stream by the appropriate number of revenue stream units (e.g., 24 biweekly collections divided by 12 weeks to yield a weekly base).

Fourth, the target revenue is determined (step 308). The target revenue is the desired amount of money in the device at the time of collection. Preferably, the target revenue for a collection for a particular telephone is determined by the processor 202 using a Doubly Stocastic Poisson Process where:

$$\text{FullRevenue} = \text{TargetRevenue} + (\text{RiskFactor} * \text{Square root}\ (\text{TargetRevenue});$$

where:

FullRevenue is a maximum revenue amount such as the amount of revenue causing a telephone to go out of service (i.e., the maximum number of coins a pay telephone can hold); and RiskFactor is a multiple of the telephone's volatility. Preferably, the RiskFactor is determined empirically to obtain the accepted/desired number of full boxes. Preferably, RiskFactor is determined by selecting a RiskFactor value and using data in the collection and revenue database 212, calculating (preferably using the processor 202) the number of devices that are expected to go out of service using this RiskFactor. Different RiskFactor values are selected until an optimal RiskFactor is obtained. An optimal RiskFactor balances as few collections as possible with as few devices out of service due to reaching FullRevenue.

If the processor 202 adds up the base revenue for each revenue stream unit for a year, the total is the annual average revenue for the device. However, weather and seasonal effects may cause variations in revenue stream units. For example, a pay phone near a beach may be expected to generate a very high percentage of its total revenue during the summer months. Thus, the expected base revenue stream during the summer months may be significantly higher than during other months. Thus, the processor 202 adjusts the base revenue for each revenue stream unit (e.g., a day or week) to account for weather and seasonal effects (step 104 above). Preferably, this is done in two steps.

First, the base revenue stream is adjusted for weather effects (step 310). Preferably, the processor 202 performs this adjustment on a daily basis by adjusting the expected revenue stream for each day by an appropriate weather index. Weather indices preferably are maintained in the second database 214 for temperature, rain, and snow. Thus, if the revenue stream unit is a day, the processor 202 adjusts the expected daily revenue stream by obtaining from the second database 214 the expected weather conditions of that day and applying the appropriate weather index to the expected revenue stream. For example, a pay telephone may have a 0.8 (80%) rain index on days having 2 hours of rain. On a day in which 2 hours of rain is forecast, the expected revenue for that phone is reduced by 80% (i.e, BaseRevenue*0.8). Further adjustments may be made for the temperature. The processor 202 performs this adjustment for each day beginning with the first day after the previous collection.

Second, the weather-adjusted base revenue is adjusted for seasonal effects (step 312). This, too, is preferably done by the processor 202 on a daily basis. For example, if the seasonal index (stored in the second database 214) for the same phone discussed above is 110% (i.e., the expected revenue is 10% higher than the base revenue), the processor 202 increases the weather adjusted base value by 10% (i.e., the processor 202 multiplies the BaseRevenue*0.8*1.1). The result of these two steps provides an adjusted expected revenue for the day.

After the processor 202 adjusts the base revenue, the processor 202 determines the next optimal collection interval (step 314). This is preferably performed by the processor 202 adding the adjusted revenue stream for each adjusted revenue stream unit beginning with the unit just after the most recent collection. After each adjusted revenue stream unit is added, the processor 202 computes the current total adjusted expected revenue stream with target revenue.

The optimal collection date is the date on which the total expected revenue is the greatest amount not exceeding the target revenue. Preferably, the optimal collection date may be adjusted to the nearest actual collection date (step 316), if the optimal collection date and actual collection date are not the same. The processor 202 retrieves collection route information from the third database 216 and compares the determined optimal collection with actual collection dates. For example, if information in the third database 216 indicates that coin collectors twice weekly drive a route for the device under consideration and that the optimal collection date does not fall on one of these days, the processor 202 determines that coins are preferably collected on the actual collection day just prior to the optimal collection date.

The data and amount of revenue collected for the device may be totaled and added to the collections record (step 318) for that device. This may be done, for example, by manually inputting the data onto the computer system 200 using the I/O 208. The information may be stored in the collection and revenue database 212. This collection revenue data may be used by the processor 202 to determine the next optimal collection date.

Determining Weather and Seasonal Indices

Figure 4A:
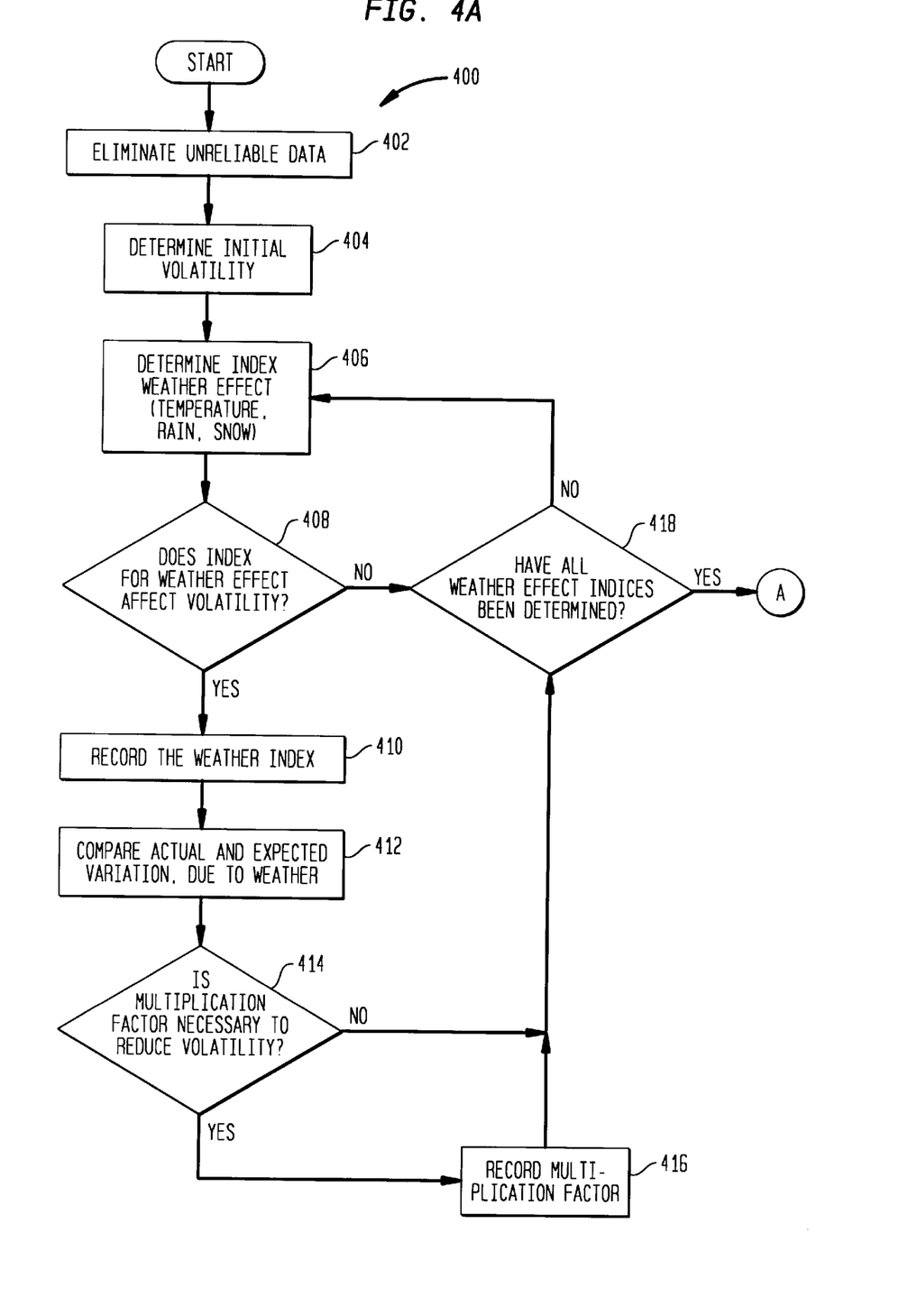
FIGS. 4A and 4B are a flow chart of a preferred method according to the present invention for determining collection indices used in the method illustrated in FIG. 3.
Figure 4B:
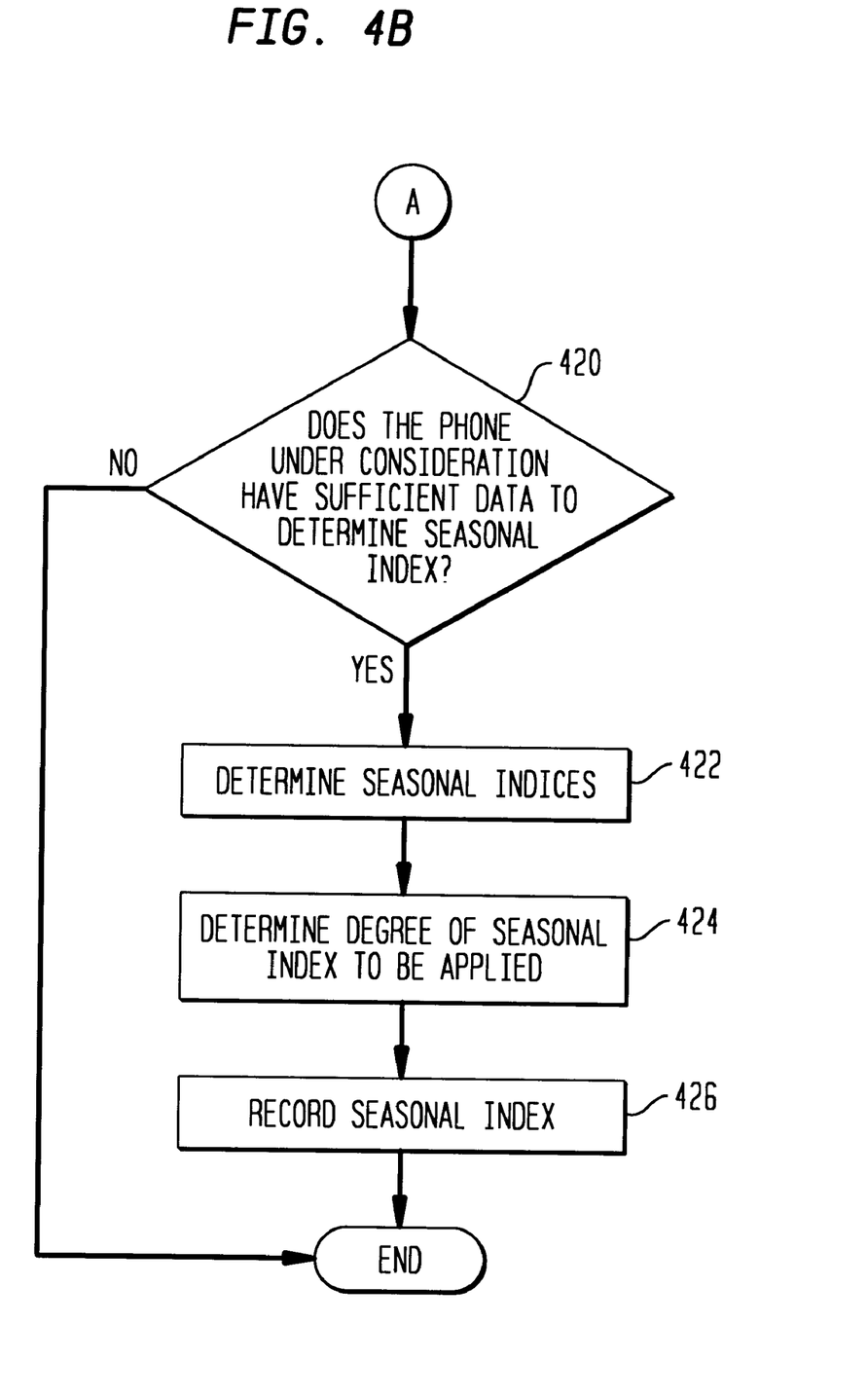

FIGS. 4A and 4B are a flowchart illustrating a preferred method 400 for determining the weather and seasonal indices for a coin operated device for use in the method described above.

First, the processor 202 eliminates unreliable data (step 402). This is preferably done in the manner described above.

Second, revenue stream volatility is determined (step 404). Preferably, this is performed by the processor 202 by determining the standard deviation of the device's revenue stream for a certain number of collections (such as 24, as described above) relative to the annual average revenue stream for that device. That is, the processor 202 retrieves collection and revenue data for the device from the first database 202 and calculates the standard deviation of the recent collections from the annual average revenue stream.

Third, weather indices are determined (step 406). Preferably, the processor 202 determines indices for temperature, rain, and snow. Preferably, temperature is considered in 5° F. blocks; rain is considered in hours rained in ½ hour blocks; and snow is considered in inches of snow in ½" blocks.

Weather indices may be compiled as follows. The processor 202 selects from the first database 212 a percentage, such as 5%, of data for a particular class of devices (e.g., outdoor coin operated devices) having the most consistent revenue stream for the weather index being considered. This is preferably done for each of the blocks described above (e.g., the 5% of outdoor pay telephones having the most consistent revenue stream at 50°—55°; the 5% of outdoor pay telephones having the most consistent revenue stream on rainy days having 2—2 ½ hours of rain, etc.). The processor 202 computes the average revenue collected from the device during each of the weather index blocks described above. Then the processor 202 determines the standard deviation of revenue collected from this average for each block (standard statistical algorithms allow the average and standard deviation to be computed in one pass through the data). The processor 202 then combines the standard deviations for all blocks (preferably applying a weighted average based on the number of samples for a particular block). The 5% of pay phones with the least standard deviation as computed above are then selected for use in the next index computation. The processor then determines an index for each block, i.e., each block in the range of temperatures, rainfall, and snowfall.

For example, if these 5% of consistent devices generated only 80% of the annual average revenue on days where the temperature was between 30°–35°, the index for that temperature block is -0.2 (i.e., 20% less than the average).

For each device and each weather index, the degree to which the index is applied to a particular device is determined by considering the collection history. If the index does not significantly affect the device's volatility, the processor 202 does not apply the index (step 408). If the index does affect volatility, the processor records the index in the weather and seasonal information database 214 (step 410). For example, if temperatures between 50° F.–75° F. have little or no effect on the expected revenue stream for the device, no temperature index will be applied to the optimal collection determination date on days forecast to have average temperatures in that range. Thus, no indices for these blocks are stored in the second database 214. A pay telephone located inside a store, for example, may not show a consistent variation with the weather. In this instance, the processor 202 records in the weather and seasonal information database 214 that the weather indices should not be applied to that phone.

The degree to which each weather index should be applied to each device is computed by the processor 202 as follows. For each collection in the collection history for the device maintained in the collection and revenue database 212, the processor 202 compares the expected variation from the annual average predicted by the weather index with the actual variation and computes the required multiplication factor to get the actual variation (step 412). For example, if the weather indices indicate that the revenue should be reduced by 60% for a particularly cold period (−0.6 weather index), but the device saw an increase in revenue of 30% (0.3 over annual average), the multiplication factor would be −0.5 (actual divided by expected). (This is typical in many indoor public phones.) The processor 202 computes this multiplication factor for each collection for the phone in the collection history and then computes the weighted average of all these multiplication factors to arrive at the multiplication factor.

Once the multiplication factor is calculated, it may be determined if the multiplication factor reduces volatility (step 414). No multiplication factor is computed for collections where the weather index under consideration predicts a variation of less than 5.1%. For example, for the temperature range from 60°–65° degrees, the index could be very small (1% of annual average) so that if the actual revenue for a phone is, for example, down 20% or 30% (due, for example, to construction in the area of the phone), a very large multiplication factor results (20 or 30), seriously distorting the results.

The processor 202 may also compare the volatility of the device's revenue stream (standard deviation) before and after the weather index is applied as computed above. If the application of the weather index computed above does not decrease volatility by a required percentage, then the multiplication factor recorded in the database 216 is set to zero (i.e., the weather index does not apply to the device). If the multiplication factor reduces volatility, it is recorded in the weather and seasonal information database 214 (step 416).

Each weather index is determined (step 418). To determine the weather indices, the weather database 214 is preferably maintained for the general geographic region. This database preferably includes (1) a history portion that includes several years of past weather data; (2) up-to-date weather forecast information; (3) regional averages for the upcoming year (e.g., average temperature of each day) provided by a weather service; and (4) weather and seasonal indices for the devices. Preferably, updated weather information—such as the previous day's weather, the current weather, and current forecasts—are daily entered into the database using, for example, the I/O 208. The optimal collection date may change as the weather forecasts change with time. For example, if a forecast changes from predicting a rain storm to predicting a sunny day, the device may be more likely to need collection sooner or later because the weather index applied to the expected base revenue for that day may change.

After each weather index is determined, the seasonal index is determined. This is done in the following three steps. First, the processor 202 retrieves data from the collection and revenue database 212 and determines if enough collection data exists for the device to determine a reliable seasonal index (step 420). It may be possible that several years of data may not have accumulated for the phone under consideration. If so, the seasonal volatility within blocks (such as a week) for that phone are considered only for those blocks (weeks) in which there is more than one year's worth of data (so that a comparison can be made between last year's performance and this year's). There must be a minimum overlap period (preferably at least ten weeks in this implementation) in order to make any determination about seasonal cycles. An overlap period is a period which data is available for corresponding blocks from more than one year. Assume, for example, data is available from a first year for weeks 1–10, 20–30, and 50–52; and from a second year for weeks 1–19 and 40–49. An overlap period occurs only for weeks 1–10.

If sufficient data is available for the device, the seasonal index is determined (step 422). The seasonal indices are preferably determined on a per device basis. The processor 202 divides a year into a number of blocks. For each block, the processor 202 determines the device's deviation from the annual average revenue for that device within the year spanned by the collection data. The processor 202 determines this deviation for each collection and this deviation is proportionally applied to the different blocks within the year spanned by the collection. Preferably, one week block sizes provide adequate divisions and also eliminate the effects of intraweek cycles (e.g., greater or lesser usage on the weekends).

For a seasonal index determined by an overlap period rather than by several years worth of data, the degree to which the processor applies the seasonal index is based on the size of the overlap period and decrease in the revenue volatility (step 424). If the volatility of the collections within each block was significantly less than the volatility of all collections, the seasonal index is recorded in the collection route information database 216 (step 426). The inventors have found that a 10% (or 0.1) improvement in volatility is an optimal minimum improvement for applying the index. That is, the stronger the correlation between blocks in the overlap period, the greater the statistical reliability of that data.

Conclusion

A method and apparatus for determining an optimal collection date are described. The inventive method uses a computer or other processor having statistical information about past collections and the effects of weather and seasonal variations to predict the optimal collection date.

The above described embodiments of the invention are intended to be illustrative only. Numerous alternative embodiments may be devised by those skilled in the art without departing from the spirit and scope of the following claims. For example, the claimed method may be used to schedule restocking vending machines or other coin operated devices.

We claim:

1. A method for determining and outputting an optimal collection date for a coin operated device, the method comprising the steps of:

a. a processor determining a base revenue and a target revenue for the coin operated device;

b. the processor adjusting the determined base revenue to account for weather and seasonal variations in expected revenue;

c. using the adjusted base revenue, the processor determining the optimal collection date;

d. the processor adjusting the optimal collection date to coincide with an actual collection date, wherein the step of adjusting the collection date includes selecting from data stored in a collection route information database an actual collection date just prior to the determined optimal collection date; and e. outputting the adjusted optimal collection date from the processor to create a coin collection schedule.

2. A method for determining and outputting an optimal collection date for a coin operated device, the method comprising the steps of:

a. a processor determining a base revenue and a target revenue for the coin operated device, wherein the step of determining the base revenue and target revenue uses data stored in a previous collection database and further includes:

a1. eliminating from consideration unreliable previous collection data;

a2. adjusting reliable previous collection data to eliminate volatility due to weather and seasonal effects;

a3. using the adjusted data, determining a previous revenue stream; and a4. using the previous revenue stream, determining the base and target revenue;

b. a processor adjusting the determined base revenue to account for weather and seasonal variations in expected revenue;

c. using the adjusted base revenue, the processor determining the optimal collection date; and d. outputting the determined optimal collection date from the processor to create a coin collection schedule.

3. The method of claim 2, wherein the step of eliminating includes eliminating data which is one of ten times greater and ten times smaller than an average value.

4. The method of claim 2, wherein the step of removing data relating to weather and seasonal effects further includes dividing the reliable previous collection data by predetermined indices.

5. The method of claim 2, wherein the step of determining a previous revenue stream further includes combining collected revenue amounts from a predetermined number of previous collections.

6. The method of claim 2, wherein the step of determining the base revenue further includes dividing the previous revenue stream by an appropriate number of revenue stream units.

7. The method of claim 2, wherein the step of determining the target revenue further includes determining the target revenue according to the equation:

Full Revenue=TargetRevenue+(Riskfactor*Square root (TargetRevenue);

where:

FullRevenue is a maximum revenue amount for the coin operated device; and

Riskfactor is a multiple of a volatility of the coin operated device.

8. The method of claim 1, wherein the step of adjusting the determined base revenue to account for weather variations in expected revenue further comprises adjusting a revenue stream unit by a predetermined weather index stored in a seasonal information database.

9. The method of claim 1, wherein the step of adjusting the determined base revenue to account for seasonal variations in expected revenue further comprises adjusting a revenue stream unit by a predetermined seasonal index.

10. A method for determining and outputting an optimal collection date for a coin operated device, the method comprising the steps of:

a. a processor determining a base revenue and a target revenue for the coin operated device;

b. a processor adjusting the determined base revenue to account for weather and seasonal variations in expected revenue;

c. using the adjusted base revenue, the processor determining the optimal collection date, wherein the step determining the optimal collection date includes adding adjusted revenue stream units until a total added adjusted revenue stream is a greatest amount not exceeding the target revenue; and d. outputting the determined optimal collection date from the processor to create a coin collection schedule.

11. A method for determining and outputting an effect of weather on a coin operated device revenue stream, using data stored in a previous collection database, the method comprising the steps of:

a. a processor eliminating unreliable previous collection data;

b. the processor determining revenue stream volatility from reliable previous collection date data; and c. using the reliable data, the processor determining weather indices;

d. outputting the determined weather indices from the processor to create a coin collection schedule.

12. The method of claim 11, wherein the step of eliminating unreliable data includes eliminating data which is one of ten times greater and ten times smaller than an average value.

13. The method of claim 11, wherein the step of determining the revenue stream volatility includes determining a standard deviation of a predetermined number of revenue collections relative to an annual average revenue stream.

14. The method of claim 11, wherein the step of determining weather indices further includes:

a. selecting a percentage of consistent revenue streams for a weather index block;

b. determining an average revenue stream for the coin operated device for the weather index block; and c. determining a standard deviation of the average revenue stream for the coin operated device.

15. The method of claim 14, wherein the step of determining further includes:

a. combining standard deviations for all weather index blocks; and b. applying a weighted average on each weather index block.

16. The method of claim 14, wherein the step of determining weather indices further includes determining a multiplication factor for a particular coin operated device.

17. The method of claim 16, wherein the step of determining a multiplication factor includes:

a. determining a variation of the particular coin operated device's deviation from the annual average with an expected deviation from the annual average; and b. using this determination, computing the multiplication factor.

18. The method of claim 17, further comprising applying the computed multiplication factor if the factor reduces volatility of the particular coin operated device.

19. A method for determining a seasonal effect on a coin operated device revenue stream, the method comprising the steps of:

a. a processor determining if sufficient previous revenue collection data exists to determine a valid seasonal effect;

b. the processor, using the previous revenue collection data, determining a deviation of a revenue stream for a seasonal block from an annual average revenue stream; and c. outputting the determined deviation of the revenue stream from the processor to create a coin collection schedule.

20. The method of claim 19, wherein the step of determining if sufficient information exists further includes considering seasonal effects of seasonal blocks in periods within a minimum overlap period.

21. The method of claim 20, further including applying the seasonal index according to a size of the overlap period and an amount of decrease in revenue volatility.

22. A device for determining an optimal collection date for a coin operated device, comprising:

a. a first database containing collection and revenue data;

b. a second database containing weather information;

c. a third database containing collection route information;

d. a processor responsive to the first, second, and third databases and configured to determine the optimal collection date for the coin operated device based on data in the databases; and e. an input and output connected to the processor, such that said output outputs the determined optimal collection date to create a coin collection schedule.

23. The device of claim 22, wherein the first database contains collection dates and collected revenue amounts.

24. The device of claim 22, wherein the second database includes historic weather information, current weather forecasts, and regional average information.

25. The device of claim 22, wherein the third database includes coin operated device location information and coin collection route information.

* * * * *